United States Patent [19]

Viscogliosi

[11] Patent Number: 4,796,729
[45] Date of Patent: Jan. 10, 1989

[54] DISC BRAKE SYSTEM

[76] Inventor: Marco Viscogliosi, 31 Lenox Ave., Pleasantville, N.Y. 10570

[21] Appl. No.: 84,924

[22] Filed: Aug. 12, 1987

[51] Int. Cl.$^4$ .................... F16D 55/02; F16D 55/26
[52] U.S. Cl. .................... 188/71.7; 188/72.4; 188/72.6; 188/72.8; 188/73.32; 188/72.3; 188/106 F; 188/196 M
[58] Field of Search ................ 188/73.33, 73.32, 71.7, 188/71.8, 71.9, 72.4, 72.5, 72.6, 72.8, 72.7, 106 F, 72.3, 73.43, 216, 196 M, 196 V

[56] References Cited

U.S. PATENT DOCUMENTS

| | | | |
|---|---|---|---|
| 3,952,844 | 4/1976 | Newstead et al. | 188/72.8 |
| 3,980,159 | 9/1976 | Baxendale | 188/71.7 X |
| 4,064,973 | 12/1977 | Deem et al. | 188/71.7 |
| 4,284,176 | 8/1981 | Haraikawa et al. | 188/71.7 |
| 4,306,635 | 12/1981 | Mitchell | 188/72.4 |
| 4,319,668 | 3/1982 | Johnson et al. | 188/72.4 |
| 4,390,084 | 6/1983 | Haraikawa et al. | 188/72.3 X |
| 4,503,946 | 3/1985 | Davidson et al. | 188/72.8 X |
| 4,619,347 | 10/1986 | Schreiner et al. | 188/72.6 |
| 4,633,978 | 1/1987 | Hoff | 188/72.8 X |
| 4,635,761 | 1/1987 | Smith et al. | 188/72.6 |

FOREIGN PATENT DOCUMENTS

| | | | |
|---|---|---|---|
| 2340518 | 2/1975 | Fed. Rep. of Germany | 188/73.32 |
| 2573498 | 5/1986 | France | 188/73.33 |

Primary Examiner—Douglas C. Butler
Attorney, Agent, or Firm—Lackenbach Siegel Marzullo & Aronson

[57] ABSTRACT

A wheel disc brake system for a motor vehicle connected to a brake fluid pressure system that includes a pressure relief apparatus for moving the inner piston of the wheel brake back into the brake housing piston chamber by an Allen wrench insert into an axial tool hole at the front face of the inner piston accessed through the axial oil hole of the outer piston. Rotation of the wrench rotates the inner piston along the actuating screw member in the brake housing and so moves the inner piston away from the outer piston so that the outer piston can be easily pushed into the brake housing and new brake pads mounted to the calipers. Reverse rotation of the wrench pulls the inner and outer pistons back into operational position. The invention also includes a cylindrical nose extending from the inner piston having at least one seal to defend the tapered actuating areas of the inner and outer pistons from contamination through the oil hole of the outer piston. The invention also includes a non-drag pressure apparatus mounted to the leaf face of the inner piston including a leaf spring ring and a retaining ring mounted to a groove in the wall of the outer piston, with the leaf spring ring exerting only sufficient pressure to start rotational movement of the inner piston along the actuating screw member upon activation of the brake fluid system.

34 Claims, 7 Drawing Sheets

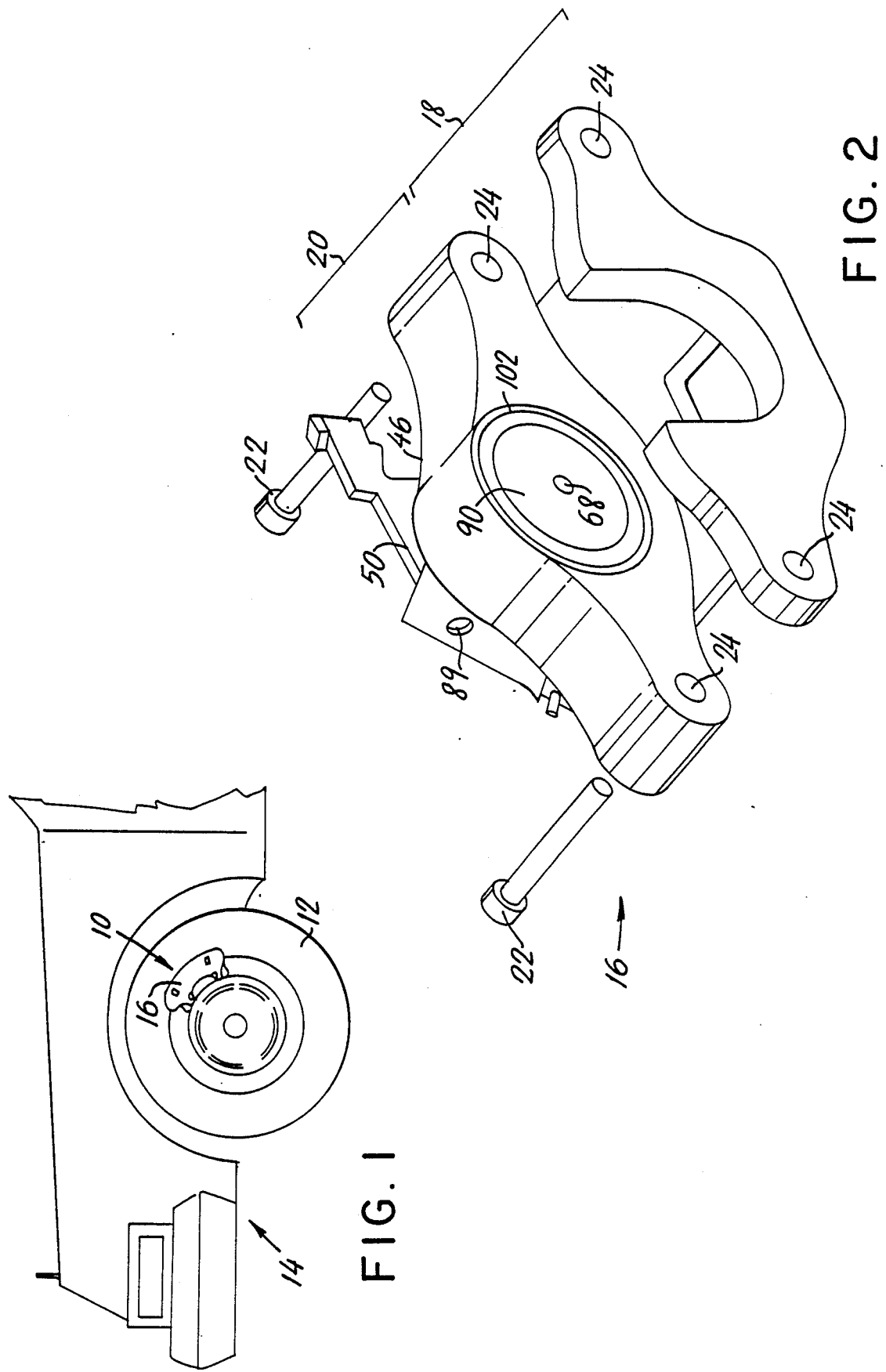

DISC BRAKE SYSTEM

BACKGROUND OF THE INVENTION

This invention relates generally to disc brake systems for motor vehicles.

The disc brake, the most common brake system in use in motor vehicles, operates by the friction of a pair of calipers pressing against the reverse sides of a rotating disc. A caliper is a device comprising a metal plate to which is mounted a frictional pad that presses against one side of a rotating disc when pressure is applied. The disc, which is a frictional ring positioned between the calipers and attached to a wheel of the vehicle, rotates with the wheel. One disc brake is positioned at each of the rear wheels or each of the front wheels, or, as is most common, at both pairs of the front and wheel wheels.

The disc brake system includes a brake housing that holds both a piston apparatus and the pair of calipers positioned around the disc. The piston apparatus is activated by a fluid brake system that is connected to a wheel brake fluid box in turn connected to the main brake fluid box.

Several problems exist in the brake disc systems now in use. One problem arises when the caliper pads are worn and must be replaced. The front wall of the piston extends slightly beyond the side wall of the housing for two reasons: First, the piston must be in constant contact with a movable caliper so as to be in position to react instantly upon activation of the brake by the driver without any slack to overcome. Second, as the caliper pads become worn, the front wall of the piston extends even more from the housing so as to overcome the space created by the worn away portion of the pads. A third reason common is that most of disc brake systems are designed so that the piston presses hard enough against the calipers to cause the wheel disc to constantly drag to some degree even when the wheel brake is not being operated; this drag design creates a pronounced ready-to-operate mode of the disc brakes. Thus, for the various reasons set forth above, the piston must be moved back into the housing in order to make room to accommodate the calipers after the new brake pads have been mounted to the metal plates of the calipers. The correct method of preparing the system for the new brake pads is generally as follows: First, the mechanic removes the emergency brake securing nut from the actuator screw at the rear of the housing; second, he rotates the actuator screw so that it pulls back the inner piston to which it is screwed; third, he removes the calipers from the wheel and replaces the brake pads; fourth, he physically presses the outer piston into the housing, a task made possible by the pulling back of the inner piston; fifth, he mounts the repaired calipers to the housing; fifth, he rotates the actuator screw in the opposite direction than in the earlier step so as to press the inner piston against the outer piston and so move the front wall of the outer piston against the calipers; and sixth, he remounts the emergency brake to the housing and replaces the emergency brake securing nut to the actuator screw. This process takes about 30 to 40 minutes for a skilled mechanic.

In this context, another problem often arises, namely, that created by an incompletely trained mechanic, who may understand the disc brake system to some extent, but who does not quite understand the relationship of the actuator screw and the emergency brake apparatus to forcing the piston back into the brake housing. It is unfortunately very common for the untrained mechanic actually to drain the brake fluid from the brake housing and then to pull the entire piston from the housing, then later to force the piston back into the housing, with the result that the rubber boot seal around the outer piston at the end of the housing is almost destroyed, among other consequences of such a misguided procedure. Such a process can often take two hours.

Another problem that exists in disc brake systems in current use is that the actuating area between the inner and outer pistons is accessible to air, humidity, and dust particles that pass through the outer oil hole at the front wall of the outer piston, even though a dust seal is inserted into the hole. The inner piston is sealed from the outer piston at a position inwards relative the actuating area. The result is that when the inner piston is caused to rotate upon the actuator screw upon application of fluid brake pressure, an action meant to force the outer piston against the nearest caliper plate by pressure around the actuating area, resistance to rotation of the inner piston created by rusting or frictionally retarding particles in the actuating area is often encountered. Two results are possible; One, the disc brake of one wheel will respond faster than the other due to an imbalance created with the disc brake on the other wheel; or two, there will be a slack response in the brake system in general.

A third problem encountered in disc brake systems in use is that in general it can be said that they are "drag" systems with a complex biasing structure in the housing so that continuous drag is created by the piston being biased against the calipers. Drag systems cause both excessive wearing of the brake pads and also add to operating cost of the vehicle since somewhat more power is needed to move the vehicle.

SUMMARY OF THE INVENTION

Accordingly, it is an object of this invention to provide a disc brake system that can have its worn brake caliper pads replaced in a few minutes.

It is another object of this invention to provide disc brake system having an outer piston that can be immediately forced back into the brake housing by a wrench that rotates the inner piston inwardly so as to free the outer piston for movement back into the brake housing during replacement of the brake caliper pads.

It is another object of this invention to provide a disc brake system having an actuating area between the inner and outer pistons that is protected by a seal against contamination by air, humidity, and dust particles.

It is yet another object of this invention to provide a non-drag disc brake system that is safe to operate and results in less brake pad wear and lower operating costs.

Accordingly, in order to achieve the above objects, as well as others that will become apparent hereafter, there is provided a wheel disc brake system for motor vehicle
a connected to a brake fluid pressure system that includes a pressure relief apparatus for moving the inner piston of the wheel brake back into the brake housing piston chamber by an Allen wrench insert into an axial tool hole at the front face of the inner piston accessed through the axial oil hole of the outer piston. Rotation of the wrench rotates the inner piston along the actuating screw member in the brake housing and so moves the inner piston away from the outer piston so that the outer piston can be easily pushed into the brake housing and new brake pads mounted to the calipers. Reverse rotation of the wrench pulls the inner and outer pistons back into operational position. The invention also includes a cylindrical nose extending from the inner piston having at least one seal to defend the tapered actuating areas of the inner and outer pistons from contamination through the oil hole of the outer piston. The invention also includes a non-drag pressure apparatus mounted to the leaf face of the inner piston including a leaf spring ring and a retaining ring mounted to a groove in the wall of the outer piston, with the leaf spring ring exerting only sufficient pressure to start rotational movement of the inner piston along the actuating screw member upon activation of the brake fluid system.

The present invention will be better understood, and the objects and important features, other than those specifically enumerated above, will become apparent when considerations given to the following details and description, which when taken in conjunction with the annexed drawings, describes, discloses, illustrates, and shows preferred embodiments of modifications of the invention and what is presently considered and believed to be the best mode of practice in the principles thereof. Other embodiments or modifications are intended to be reserved especially as they fall within the scope and spirit of the subjoined claims.

BRIEF DESCRIPTION OF THE DRAWINGS

FIG. 1 is an elevation view illustrating a disc brake mounted to the wheel of a motor vehicle;

FIG. 2 is a perspective view of a disc brake housing shown in isolation;

DESCRIPTION OF THE PREFERRED EMBODIMENTS

Figure 3:
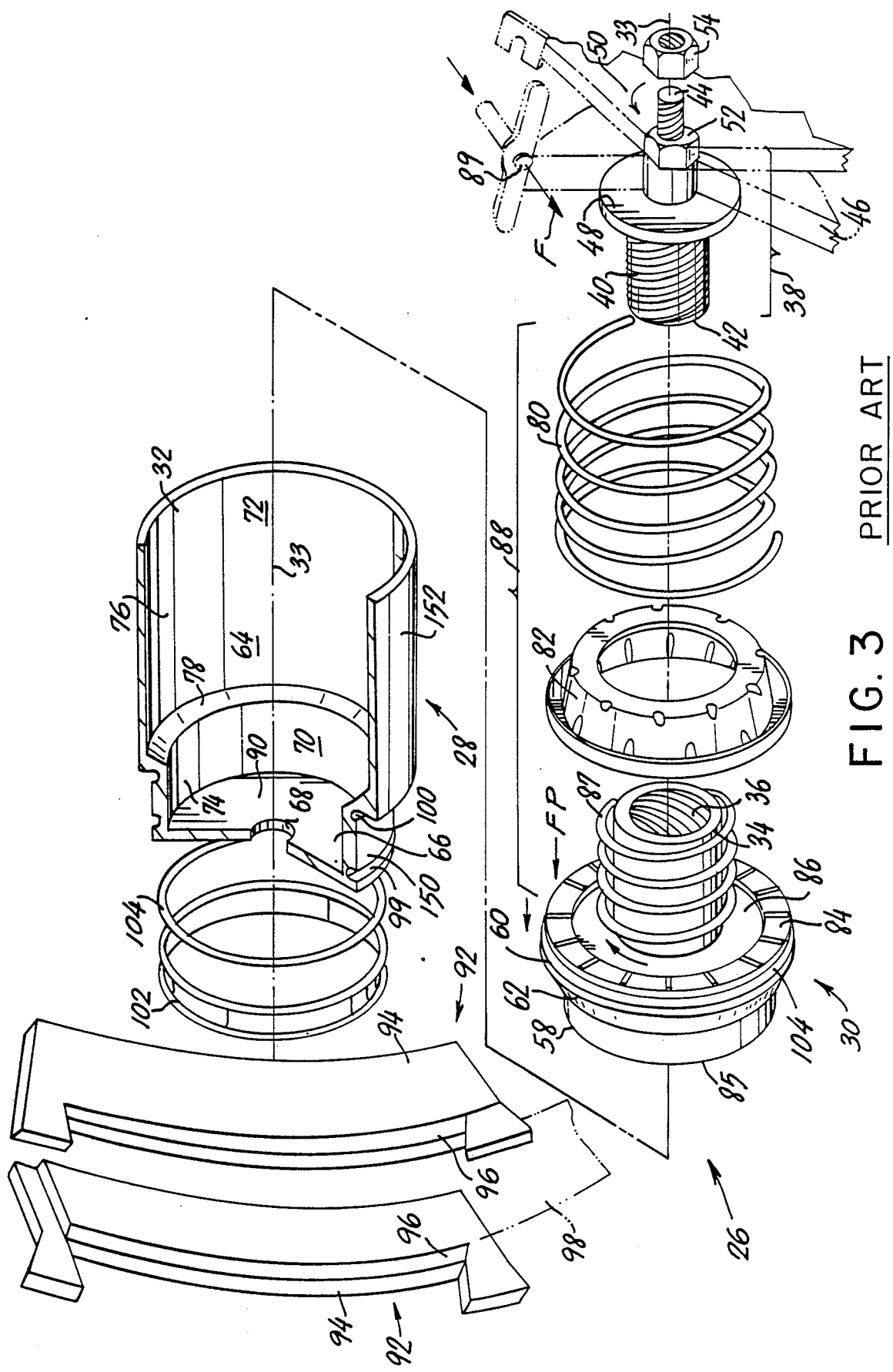
FIG. 3 is a fragmented exploded perspective view of a prior art disc brake system.
Figure 4:
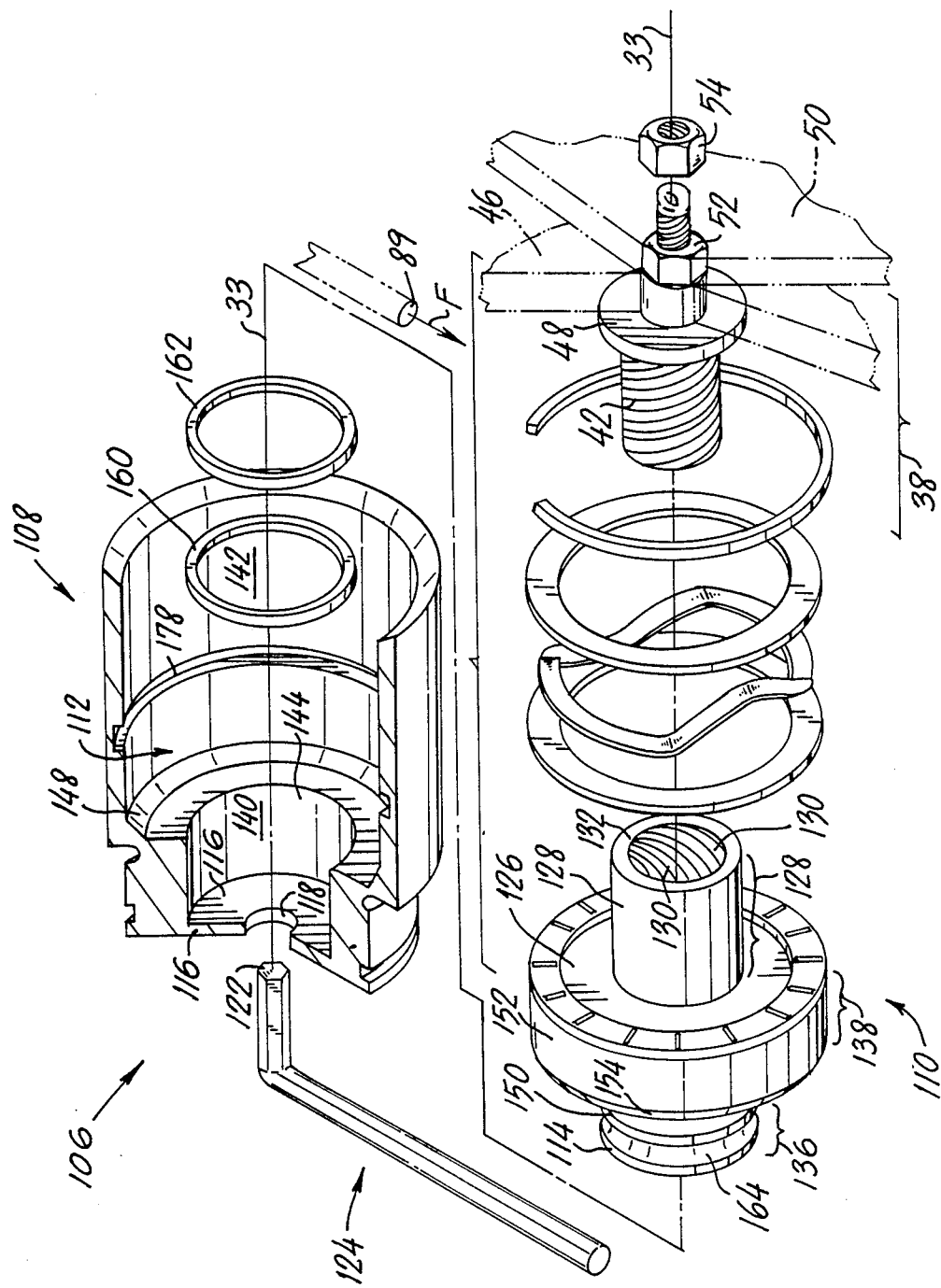
FIG. 4 is a fragmented exploded perspective view of the disc brake system according to the present invention.
Figure 5:
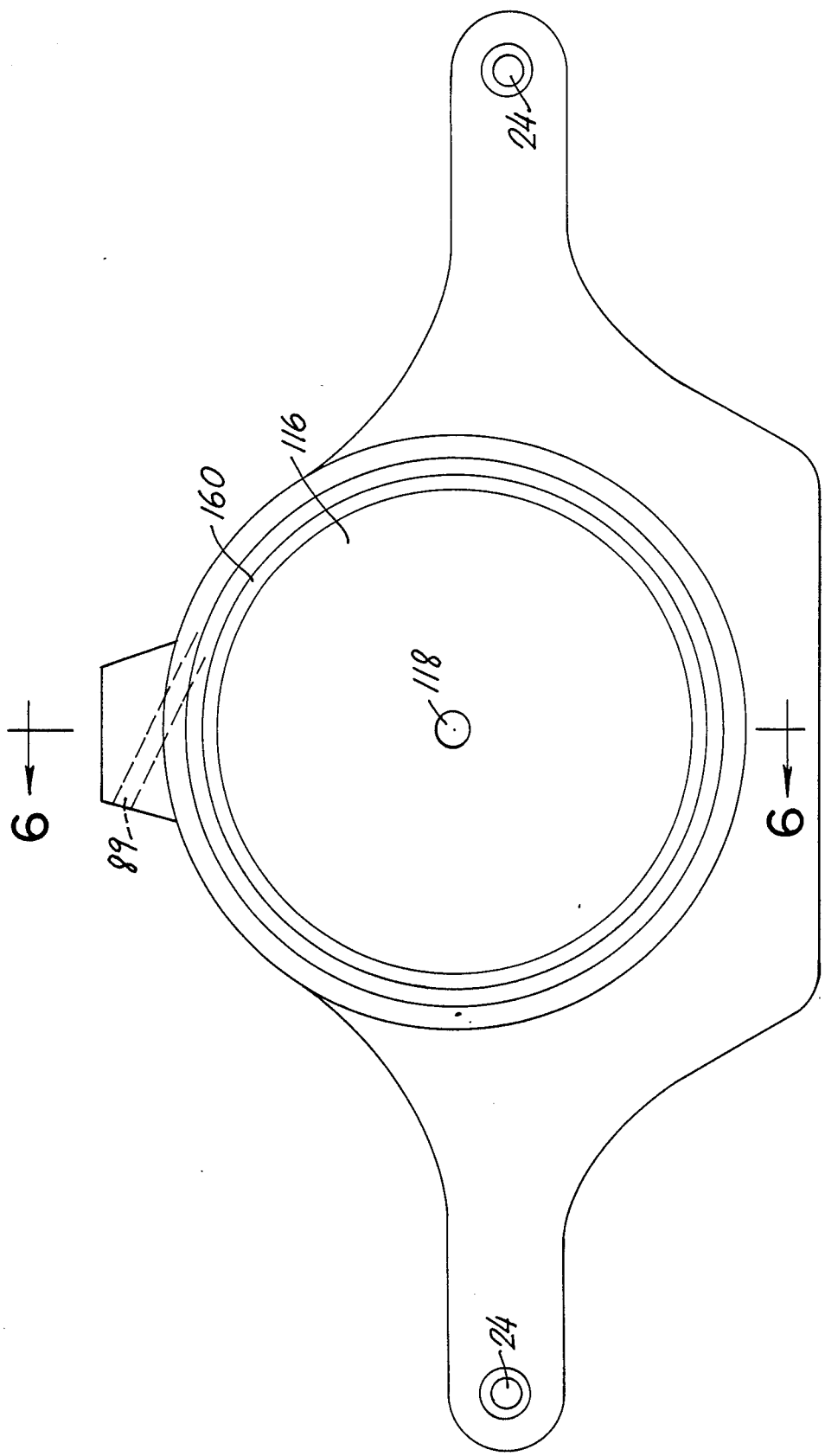
FIG. 5 is is a frontal elevation view of the piston mounted in the brake housing.

Reference is now made specifically to the drawings, in which identical or similar parts are designated by the same reference numerals throughout.

FIG. 1 illustrates a disc brake system 10 according to the present invention mounted to the front wheel 12 of a motor vehicle 14. FIG. 2 illustrates in isolation a disc brake housing 16, which includes a caliper and wheel disc mounting portion 18 and a housing enclosed portion 20. A pair of housing bolts 22, which pass through bolt holes 24 of the housing and secure the housing to the chassis of the motor vehicle, are shown by way of representation of various other securing parts.

Figure 11:
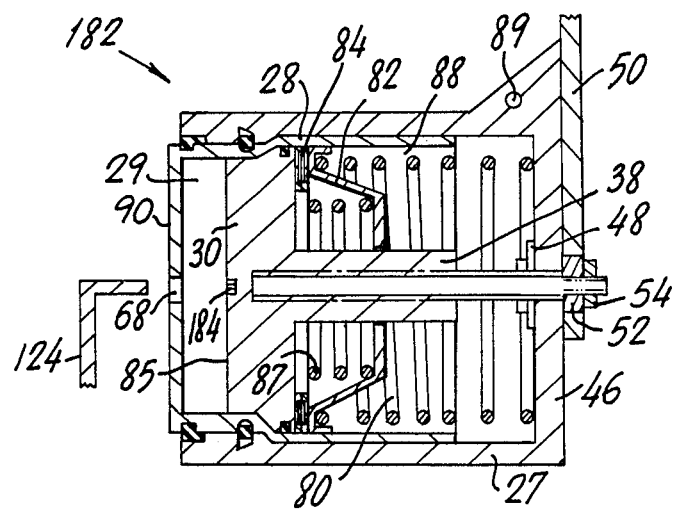
FIG. 11 is a cross-sectional view of a prior art type disc brake system with a pressure relief tool hole in the front wall of the inner piston.

FIG. 3 illustrates a prior art disc brake system 26, which is mounted to a brake housing 16 that is the same as housing 16 shown in FIG. 2. FIG. 11 shows a disc brake system having many features of prior art system 26 and also illustrates the features of prior art system 26 with many of the numerals used in describing FIG. 3 also used there. Prior art brake system 26 includes a cylindrical outer piston 28 that is position in axially movable relative to a cylindrical piston chamber 29 of brake housing 16 and a cylindrical inner piston 30 that is positioned in a cylindrical piston chamber 32 formed by outer piston 28. Housing piston chamber 29 and outer and inner pistons 28 and 30 are axially coextensive with an axis 33. Inner piston 30 is both axially movable and rotatable within piston chamber 32. Inner piston 30 includes a cylindrical rear actuating portion 34 having an actuating recess extending from the rearward axial center of inner piston 30 and which has internal threads 36. A cylindrical actuating screw member 38 axially coextensive with outer and inner pistons 28 and 30 has external threads 40 mated with external threads 36. Actuating screw member 38 has an inner end 42 positioned in the actuating recess of rear actuating portion 34 and an outer end 44 positioned external of the rear wall 46, shown in broken phantom line, of the enclosed portion of the brake housing. An inner retaining ring 48 is pressed flush with the inner surface of rear wall 46, against a stop ring 49 (shown in FIG. 11) integral with actuating screw member 38; and actuating arm 50, shown in phantom line, of the emergency brake apparatus is wedged onto a mounting nut 52 integral with actuating screw member 38 and is press mounted against the outer surface of rear wall 44 by a locking nut 54 which is screwed onto the threads at outer end 44.

Actuating screw member 38 is not movable axially relative either in brake housing or relative to outer and inner pistons 28 and 30. In addition, actuating screw member 38 is not rotatably movable relative the brake housing or outer and inner pistons 28 and 30 under ordinary brake operating modes as will be explained. Actuating screw member 38 is rotatably movable in the emergency brake operation mode when actuating arm 48 is rotated counterclockwise as facing inwardly as shown by directional arrow, with a result that will be explained.

Inner piston 30 includes a cylindrical forward inner piston portion 58 and a cylindrical rearward inner piston portion 60, with the diameter of rearward portion being of greater diameter than forward portion 58. A circumferential taper of about 45° extending between forward portions 58 and 60 has an area which is designated actuating area 62. Outer piston 28 in addition to forming cylindrical piston chamber 32 has an outer front wall 66 with an axial oil hole 68 and an open end reverse from front wall 66. Piston chamber 32 has forward and rearward piston chamber portions 70 and 72, respectively, which are adapted to receive in axial and rotatable movements forward and rearward inner piston portions 58 and 60, respectively. Forward and rearward piston chamber portions are defined by forward and rearward inner surfaces 74 and 76, respectively. A circumferential taper of about 45° extending between forward and rearward inner surfaces 74 and 76 is designated actuating area 78. Actuating area is always maintained in some pressure contact with actuating area 78 in the non-activated mode of the brake system by outer helical spring 80, which is positioned in a biased mode between rear wall 46 of the brake housing and the circular pocket of a retaining cap 82, which is fitted around actuating screw member 38 and in contact with bearing member 84 at its circular base. Inner piston has a front face 85 at forward inner piston portion 58 and an opposite rear face 86 at rearward inner piston portion 86. Bearing member 84 is in pressing contact with rear face 86. A helical positioning spring 87 positioned within retaining cap 82 is in contact with rear face 86 and with the inner surface of retaining cap 82 in order to keep retaining cap 82 and helical spring 8 from shifting. When the operator of the motor vehicle activates the brake fluid pressure, fluid F enters a fluid pressure chamber 88 formed by brake housing 16 rearward of outer and inner pistons 28 and 30 through a brake fluid port 89 so as to exert fluid pressure against rear face 86 of inner piston 30. Spring 80 has already created a "starting" pressure on inner piston 30 so that internal threads 36 begin to rotate relative to external threads 40 of actuating member 38 so that inner piston 30 moves axially outwardly in pressing contact with outer piston 28 at actuating area 62 with the result that front wall 90 of outer piston 28 presses against brake calipers 92, particularly metal plate 94 of the inner caliper so that pad 96 presses against disc 98, shown in phantom line, and disc 98 presses against the other pad 96 and presses the other plate 94 against wall of housing mounting portion 18. Release of the brake fluid pressure will result in outer piston 28 being biased back by outer piston seal 100 so as to press inner piston 30 back in an axial direction so that it rotates in the opposite direction to its original position. Outer piston 28 is sealed at around front wall 90 by a sealing boot 100 to housing piston chamber 29.

Air, dampness, and particles will eventually enter housing piston chamber 29 despite a removable plug seal (not shown) that is ordinarily positioned in oil hole 68. These undesirable substances eventually pass to the area between actuating areas 62 and 78 where some rusting may occur or dust particles may settle. It is apparent that when this occurs, rotational movement of inner piston 30 will be inhibited to a lesser or greater degree, with the result that axial outward movement of inner piston 30 will also be inhibited as will the axial movement of outer piston 28. Delayed or unbalanced wheel braking will then occur. A seal 104 set around inner piston 30 that rides against rearward 76 inner surface 76 or rearward inner piston chamber 72 of outer piston 28 is of no help in defending the actuating area from contamination.

Front wall 90 of outer piston 28 extends outwardly from the front face of housing piston chamber 29 even with new calipers. When pads 96 wear down, front wall 90 extends even more from housing piston chamber 29. When pads 96 are to be replaced with new pads, front wall 90 must be moved back into piston chamber 29. This is properly accomplished by removing locking nut 54 from outer end 44 of actuating screw member 38, removing actuating arm 50 of the emergency brake system from mounting nut 52 of actuating screw member 38, and rotating actuating screw member 38 with a tool in the direction shown by arrow 56 in accordance with the orientation of internal and external threads 36 and 40. The rotation of actuating screw number 38 results in threading inner piston 30 onto actuating screw member 38 so as to axially move inner piston 30 away from outer piston 28. When sufficient withdrawal has occurred, outer piston 28 can then be pushed into piston chamber 29 by the exertion of pressure against front wall 90. After replacement of the pads, actuating screw member 38 is then rotated in the opposite direction so that inner piston 30 is rotated in a direction that moves it axially against outer piston 28 until outer piston 28 is in the desired position relative calipers 92. The presence of helical spring 80 indicates that front wall 90 will be in pressure contact with the inner caliper of calipers 92 to accomplish a drag mode brake system. Emergency brake arm 50 is then replaced onto mounting nut 52 and locking nut is then mounted to the actuating screw member.

Figure 6:
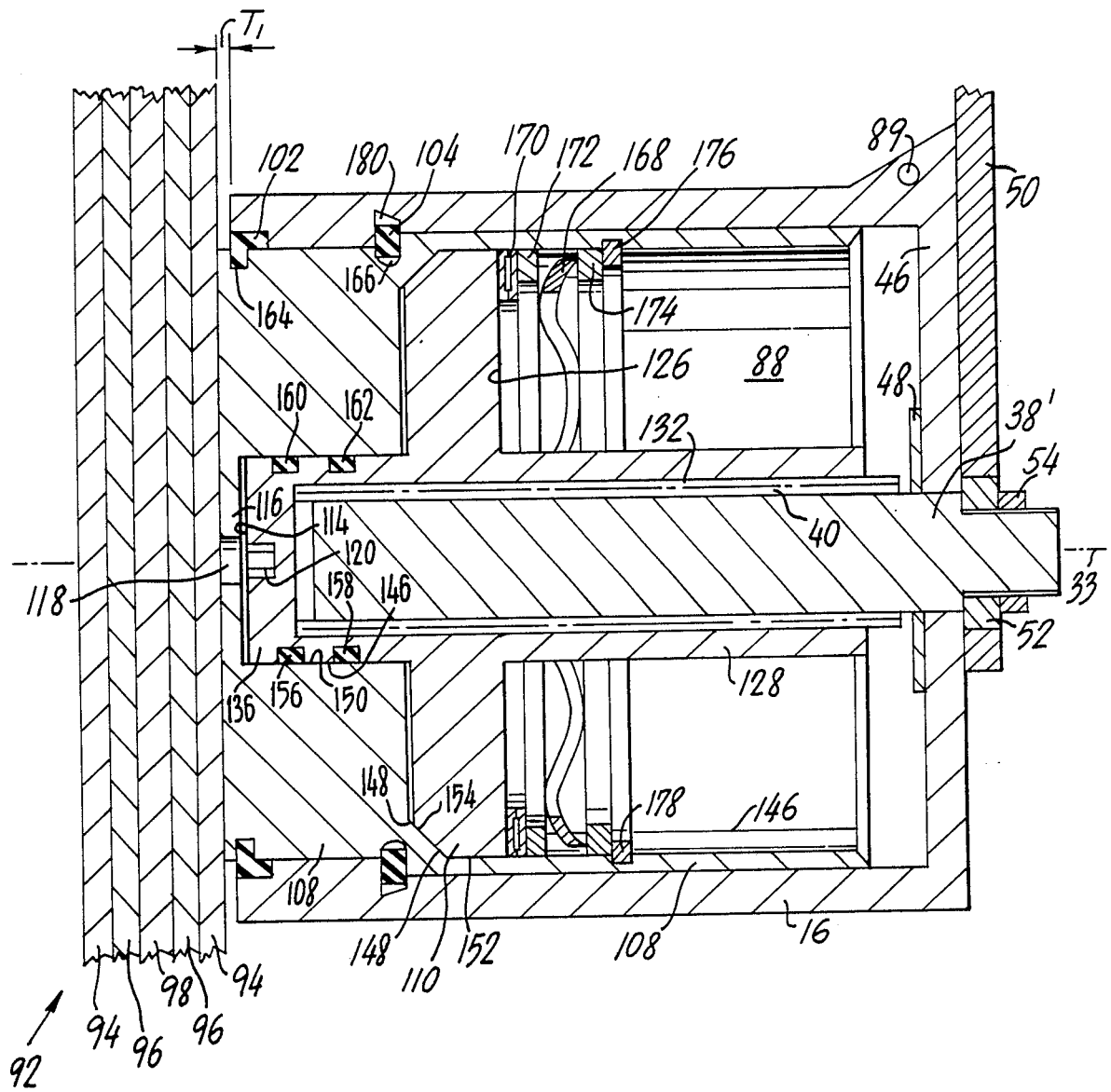
FIG. 6 is a view taken along line 6—6 in FIG. 3.
Figure 7:
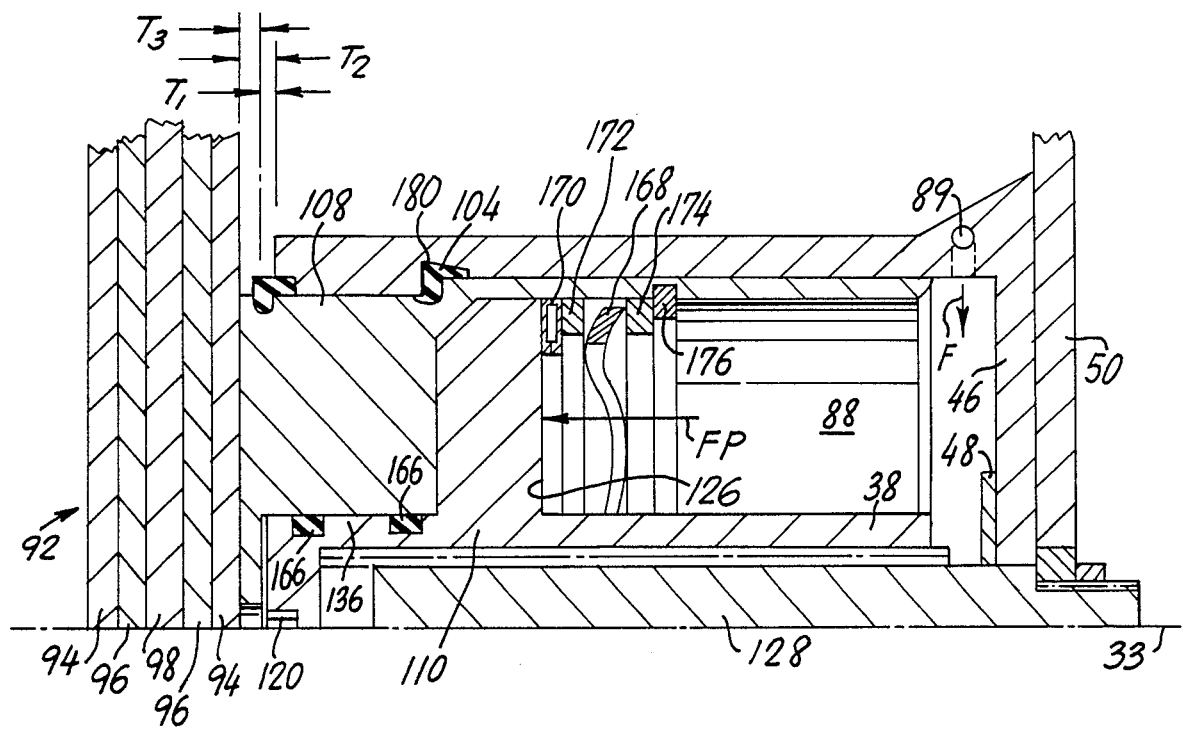
FIG. 7 is half sectional view similar to the view shown in FIG. 6 except that the piston has been actuated by fluid pressure by the fluid brake system.

A disc brake system 106 in accordance with the present invention is illustrated in detail in FIGS. 4-8 with housing enclosed portion 20, calipers 92, and brake disc 98 shown in FIGS. 6 and 7. A cylindrical outer piston 108 axially coextensive with axis 33 is positioned in and axially movable relative to axis 3 in housing piston chamber 29. A cylindrical inner piston 110 axially coextensive with axis 33 positioned in a cylindrical piston chamber 112 formed by outer piston 108 is both rotatably and axially movable relative to axis 33 within piston chamber 112. Inner piston 110 has a front face 114 perpendicular to axis 33. Piston chamber 112 is partly defined by a front wall 116 of outer piston 108 perpendicular to axis 33 and in contact with front face 114; piston chamber 112 has an open side opposite from front wall 116. Front wall 116 has a central oil hole 118. Front face 114 has a central tool hole 120 axially aligned with oil hole 118 and with axis 33. The working end 122 of an Allen wrench 124 can be extended through oil hole 118 and fitted into tool hole 120. The handle of Allen wrench 124 can then be rotated so that inner piston 110 is rotated within piston chamber 108 with a result that will be explained below.

Inner piston 110 includes a rear face 126 reverse to front face 114. A cylindrical rear actuating portion 128 is connected to rear face 126. Rear actuating portion 128 has an elongated cylindrical recess 130 axially coextensive with axis 130 and which forms internal threads 132. Rear actuating portion 128 is analogous to rear actuating portion 34 described in relation to FIG. 3. FIGS. 4, 6, 7, and 8 illustrate analogous elements to those shown in FIG. 3, namely actuating screw member 38 with its external threads 40 and inner and outer ends 42 and 44, rear wall 46 of housing 16, inner retaining ring 48, actuating arm 50 of the emergency brake system, mounting nut 52, locking nut 54, and stop ring 49 (shown in FIG. 11), with the operational relationship of the named elements being the same as described in relation to FIG. 3.

Inner piston 110 has a cylindrical forward inner piston portion, or nose, 136 and a cylindrical rearward inner piston portion 138. Rearward inner piston portion 138 has a greater diameter than nose 136. Piston chamber 112 includes a forward piston chamber portion 140 and a rearward piston chamber portion 142. Nose 136 and rearward inner piston portion 138 are rotatably and axially movably positioned in in forward and rearward piston chamber portions 140 and 142, respectively. Outer piston 108 has a forward cylindrical inner surface 144 and a rearward cylindrical inner surface 146, which in part define forward and rearward inner chamber portions 140 and 142, respectively. A circumferential taper 148 angled at approximately 45° is located between forward and rearward cylindrical inner surfaces 144 and 146, taper 148 having an area which an actuating area of outer piston 108. Nose 136 has a forward cylindrical outer surface 150 and rearward inner piston portion 142 has a rearward cylindrical inner surface 152. A circumferential taper 154 angled at approximately 45° is located between forward and rearward inner surfaces 150 and 152, taper 154 having an area which is an actuating area of inner piston 110.

Nose 136 forms two circumferential grooves 156 and 158 in forward outer surface 150 in which are positioned a pair of seals 160 and 162, respectively, which are in sealing contact with forward cylindrical inner surface 144. Seals 160 and 162 protect the actuating areas at tapers 148 and 154 from contamination entering through oil hole 118. One seal can defend the actuating area from contamination. Nose 136 can be feature of prior art system 26 with nose 136 being positioned forward of taper 32 mutatis mutandis.

Figure 8:
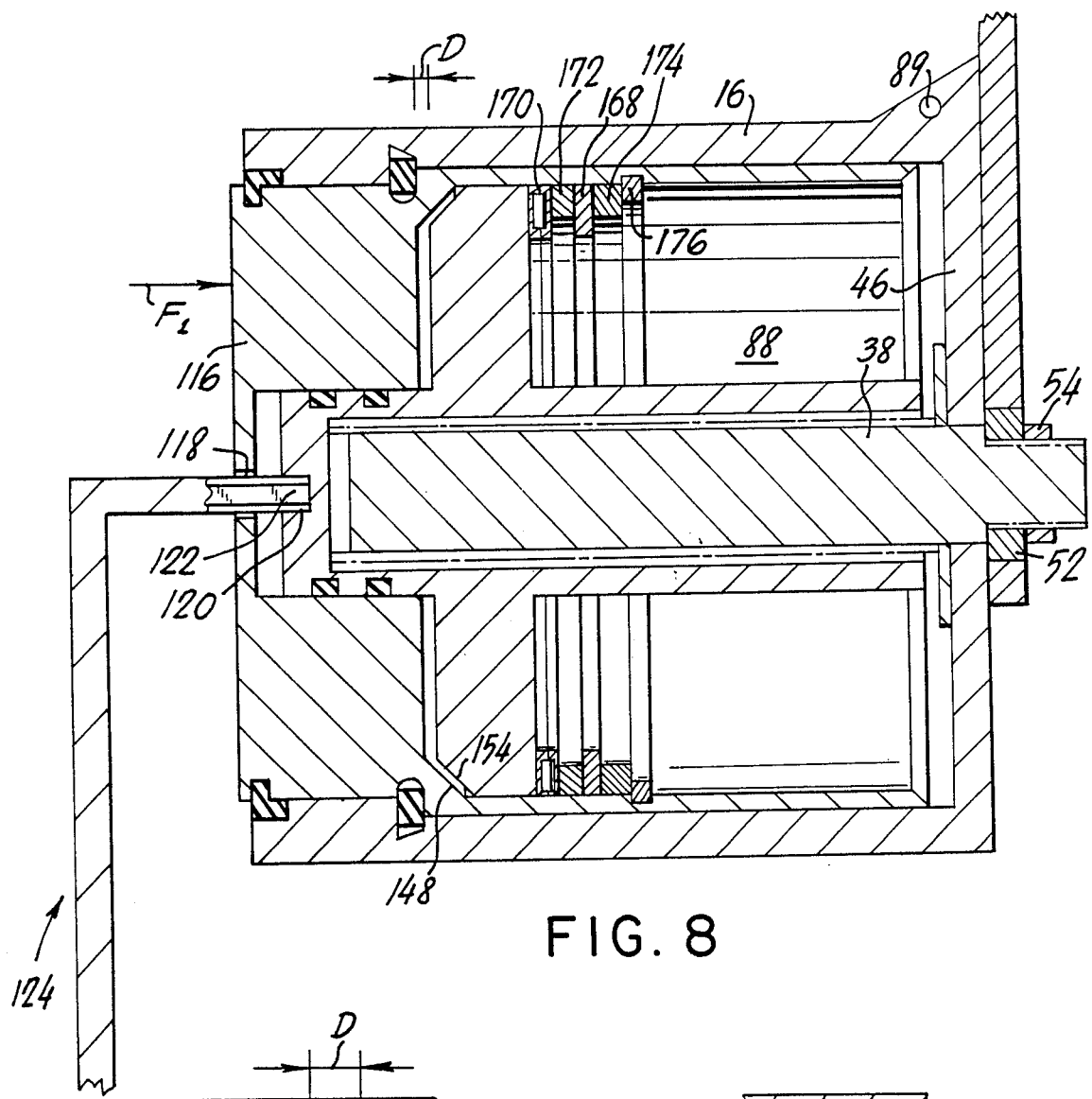
FIG. 8 is a partial sectional view similar to the view shown in FIG. 6 with the inner piston having been moved back in the brake housing by an Allen wrench.

Forward outer surface 150 forms a forward groove 164 for holding boot seal 102 shown in FIG. 3 and a second rearward groove 166 just forward of taper 78 for holding biasing seal 104, both shown in FIGS. 6–8.

Disc brake system 106 is a non-drag brake system having a pressure apparatus that positioned in fluid pressure chamber 88 and which includes a leaf spring ring 168 axially coextensive with axis 33 and spaced from rear face 86 of inner piston 110; a roller bearing ring 170 in bearing contact with rear face 86, a forward pressure ring in pressure contact with roller bearing ring 170 and leaf spring ring 168, a rearward pressure ring 174 in pressure contact with leaf spring ring 168, and a retaining ring 176 locked into a circular groove 178 formed in rearward inner surface 146. Retaining ring 176, which is in pressure contact with rearward pressure ring 174, locks the pressure apparatus so that leaf spring ring 168 is partly biased to the extent that sufficient starter pressure is exerted on inner piston 110 that internal threads 36 of inner piston 110 will begin to rotate relative to external threads 40 of actuating screw member 38' when brake fluid F is activated to enter fluid chamber 88 so as to pressure inner piston 110 to rotate and move axially against outer piston 108 at the taper actuating areas 154 and 148. Even though the system is a non-drag brake system, there is a small distance $T_1$, shown exaggerated in relative to the system for purposes of exposition, that front wall extends past the planar face of housing piston chamber 29 to a contact, non-drag position with the inner surface of the inner plate of plates 94 of calipers 92. Brake system 106 is illustrated in its inactivated mode in FIG. 6 and in its activated mode in FIG. 7 where fluid pressure FP exerted against rear face 126 of inner piston 110 by brake fluid F entering fluid chamber 88 through port 89 upon activation of the brake fluid system. In the activated position, front wall 116 of outer piston 108 extends past the distance $T_1$ to a new distance $T_2$. This occurs when inner piston 110 both rotates and moves axially outwardly so as to press against outer piston 108 at taper actuating area 148. The total movement of outer and inner pistons 108 and 110, shown as $T_3$, is in the range of 0.020 inch. The distance T1 varies in accordance with the amount of wear on brake pads 96, which can each wear down from a 0.50 inch thickness to a 0.25 inch thickness.

The return of outer piston 108 along with inner piston 110 is accomplished in a manner known in the art by the biasing action of return biasing seal, or ring, 104, which is distorted into a biased mode as seen in FIG. 7 between an external groove 180 formed in the outer surface of outer piston 108 and rear groove 166 formed in the outer surface of outer piston 108 so that, when the fluid pressure being applied in the system against inner piston 110 is removed, biasing ring 104 biases outer piston 108, along with inner piston 110, back to the original inactivated position shown in FIG. 6.

Figure 9:
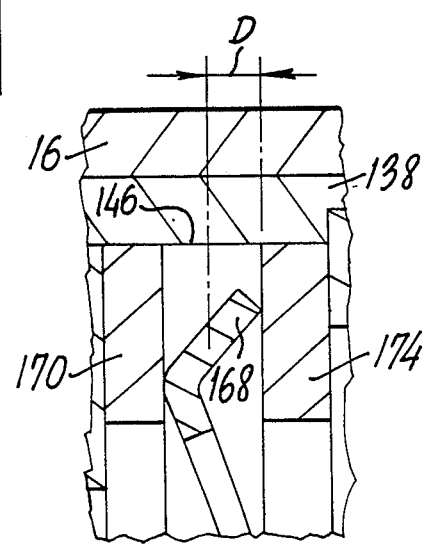
FIG. 9 is an isolated cross-sectional view of the peripheral area of the leaf spring ring as positioned in FIG. 7.
Figure 10:
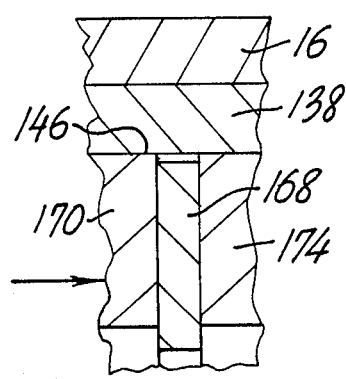
FIG. 10 is an isolated cross-sectional view of the peripheral area of the leaf spring ring as positioned in FIG. 8.

The operational maintenance sequence is as follows. Allen wrench 124 is inserted through oil hole 118 and rotated so as to rotate inner piston 110 in a direction opposite to the direction it is rotated by the pressure of the brake fluid pressure describe above. This rotational movement along actuating screw member 38 causes an inward axial movement of inner piston 110 away from contact with outer piston 108, and more particularly, movement of inner piston actuating area 154 from outer piston actuating area 148. The distance of inward movement is indicated as distance D in FIG. 8, which exaggerates the distance for purposes of exposition. The distance D that piston 110 can be moved inwardly is limited by retaining ring 17 and the compressibility of leaf spring ring 168, shown in detail in FIG. 9 prior to compression and in FIG. 10 having been compressed as illustrated also in FIG. 8. The distance D is approximately 0.020 inch. Outer piston 108 is then pushed by an exertion of force $F_1$ against front wall 116 so as to axially move outer piston 108 distance D into housing piston chamber 29. FIG. 8 illustrates outer piston 108 before the application of force $F_1$. After new brake pads have been placed on plates 94, Allen wrench 124 is once again inserted into tool hole 120 and rotated in the opposite direction of the first direction described above with the result that inner piston 110 is rotated along actuating screw member 38 so as to axially move inner piston 110 back to its original position or to a selected position ready for activation. When inner piston 110 is pulled back from the maintenance position shown in FIG. 8, the inner piston pushes outer piston 108 along so that front wall 116 is positioned at a selected position relative calipers 92.

FIG. 11 illustrates a disc brake system 182 that includes few of the features of prior art disc brake system 26 shown in FIG. 3 with a tool hole 184 formed in front face 85 of outer piston 28 adapted to receive the working end of Allen wrench 124, which is adapted to pass working end 122 through oil hole 68. The maintenance operation of system 182 is that as described in relation to disc brake system 106 of FIGS. 4–10, except that inner piston 30 can be axially moved inwardly into housing piston chamber 29 a distance greater than distance D, since there is no retaining ring 176 in system 182. The function of retaining ring 176 of system 106 is performed by prior art type helical positioning spring 87 as illustrated in the prior art drawing of FIG. 3.

The other inventive features of disc brake system 106, particularly the pressure apparatus including leaf spring ring 168, retaining ring 176, and the other elements described in relation thereto; and also the features o nose 136 and seals 160 and 162, can also be incorporated with prior art disc brake system 26 independently one from the other.

The embodiment o this invention particularly disclosed and described hereinabove is presented merely as an example of the invention. Other embodiments, forms, and modifications of the invention coming within the proper scope and spirit of the appended claims will, of course readily suggest themselves to those skilled in the art.

What is claimed is:

1. A brake system for a motor vehicle connected to a brake fluid pressure system and including calipers positioned around a wheel disc and an emergency brake apparatus, including, in combination, a housing mounted to the vehicle proximate a wheel, said housing including a housing mounting portion holding said calipers and a housing enclosed portion having a housing chamber having an axis, outer piston means positioned in said housing chamber for exerting pressure against said calipers, said outer piston being axially aligned with and movable along said axis, said outer piston means having a first actuating area, inner piston means positioned in said outer piston for moving said outer piston means from an inactivated position to a selected activated position so as to create pressure against said calipers and said disc, said inner piston means having a second actuating area in pressure contact with said first actuating area, said inner piston means being rotatable about said axis and movable along said axis, actuating screw means positioned in said housing chamber for providing rotational and axial movement movement for said inner piston relative said outer piston means, said actuating screw means also being operatively connected to the emergency brake apparatus, fluid chamber means in said housing chamber operatively connected to the brake fluid pressure system, said fluid chamber means being for containing brake fluid of the brake fluid system so that fluid pressure can be exerted against said inner piston when the brake fluid brake system is activated so as to rotate and axially move said inner piston means relative said actuating screw means, return means for moving said outer piston from said selected activated position to said inactivated position when the brake fluid system is deactivated, pressure means for maintaining said inner piston means in contact with said outer piston means and for initiating movement of said inner piston means from said inactivated position towards said selected activated position upon activation of the brake fluid system, and pressure relief means associated with said inner piston means for axially rotating and moving said inner piston means from contact with said outer piston means at said first and second actuating areas, wherein said outer piston means can be subsequently moved inwardly into the housing without resistance.

2. The brake system according to claim 1, wherein said inner piston means includes a cylindrical inner piston having an axis coextensive with said axis and a front face transverse to said axis; and said outer piston means includes a cylindrical outer piston having an axis coextensive with said axis, said outer piston forming a cylindrical piston chamber in which said inner piston is rotatably and axially movably positioned, said outer piston having an outer front wall transverse to said axis facing the calipers and associated with said front face of said inner piston, said front wall having an central oil hole; and wherein said pressure relief means includes said front face having a central tool hole axially aligned with said axis.

3. The brake system according to claim 2, wherein said pressure relief means further includes a tool having a working end, said tool being adapted to pass through said oil hole and said working end being adapted to be operatively received by said tool hole, said inner piston being adapted to be rotated by said tool so as to rotate about said actuating screw means and so retreat into said housing enclosed portion from said cylindrical piston chamber so that said second actuating area is spaced from said first actuating area.

4. The brake system according to claim 3, wherein said inner piston includes a rear face reverse from said front face and a rear actuating portion connected to said rear face, said rear actuating portion having a cylindrical actuating recess axially coextensive with said axis and having internal threads; and wherein said actuating screw means includes an elongated cylindrical actuating member positioned in said actuating recess axially coextensive with said axis and having external threads mated with said external threads, said actuating member having opposed outer and inner ends, said inner end being rotatably secured to said housing and there connected to the emergency brake apparatus, said outer end being positioned in said actuating recess, said inner piston being rotatably movable in a first direction about said actuating member at said cylindrical recess and being simultaneously axially movable outwardly so as to press said second actuating area against said first actuating area so as to move said outer piston outwardly against said calipers upon activation of said brake fluid system, said inner piston being also rotatably movable in a second direction about said actuating member so as to move said second actuating area axially inwardly away from said first actuating area upon rotation of said wrench in said tool hole.

5. The brake system according to claim 2, wherein said inner piston includes a forward inner piston portion and a rearward inner piston portion, said rearward inner piston portion being of greater diameter than said forward piston portion; wherein said forward piston chamber portion includes a forward piston chamber portion and said rearward piston chamber portion includes a rearward piston chamber portion, said forward and rearward inner piston portions being rotatably and axially movably positioned in said forward and rearward piston chamber portions, respectively; wherein said outer piston has a forward cylindrical inner surface and a rearward cylindrical inner surface, said forward and rearward cylindrical inner surfaces in part defining said forward and rearward piston chamber portions, respectively; wherein a first circumferential taper is located between said forward and rearward cylindrical inner surfaces, said first taper having a first circumferential area which is said first actuating area wherein said rearward inner piston has a forward cylindrical outer surface and a rearward cylindrical outer surface; and wherein a second circumferential taper is located between said forward and rearward cylindrical outer surfaces, said second taper having a second circumferential area which is said second actuating area.

6. The brake system according to claim 5, wherein said forward cylindrical inner piston portion includes said front face.

7. The brake system according to claim 6, wherein said forward cylindrical inner piston portion has a radius spaced radially inwardly from said second taper.

8. The brake system according to claim 7, wherein said forward cylindrical outer surface of said forward inner piston portion forms at least one circumferential groove, and further including a seal positioned in said at least one groove, said seal being in sealing contact with said forward cylindrical inner surface of said outer piston, wherein said first and second actuating areas are protected from contamination entering said piston chamber through said oil hole.

9. The brake system according to claim 8, wherein said at least one groove is a plurality of circumferential grooves and said seal is a plurality of seals positioned in said plurality of grooves.

10. The brake system according to claim 6, wherein said forward cylindrical inner piston has a radius extending to said second taper.

11. The brake system according to claim 5, wherein said housing chamber forms a fluid chamber rearward of said outer and inner pistons, said fluid chamber means being said fluid chamber; wherein said brake system is a non-drag system; and wherein said pressure means is positioned in said fluid chamber and includes leaf spring means positioned in bearing association with said inner piston and retaining means secured to said rearward cylindrical inner surface of said outer piston spaced from said leaf spring means, said leaf spring means being biased so as to maintain pressure contact between said first and second actuating areas and to initiate movement of said inner piston at said actuating member upon activation of the brake fluid pressure system, said retaining means being for maintaining said leaf spring means in a biased mode.

12. The brake system according to claim 11, wherein said leaf spring means includes a leaf spring ring axially coextensive with said axis and spaced from said rearward cylindrical inner surface of said outer piston; a roller bearing ring axially coextensive with s id axis and positioned between said leaf spring ring and said rear face of said inner piston in sliding contact with said rearward cylindrical inner surface of said outer piston; a forward ring member axially coextensive with said axis positioned in pressure contact with said roller bearing ring and said leaf spring ring and in sliding contact with said rearward cylindrical inner surface; and a rearward ring member axially aligned with said axis in pressure contact with said bearing member and with said retaining means and in sliding contact with said rearward cylindrical inner surface of said outer piston; and wherein said retaining means is a retaining ring, said rearward cylindrical inner surface of said outer piston having a circular groove, said retaining ring being positioned in said groove.

13. The brake system according to claim 12, wherein said inner piston means includes a cylindrical inner piston having an axis coextensive with said axis and a front face transverse to said axis; and said outer piston means includes a cylindrical outer piston having an axis coextensive with said axis, said outer piston forming a cylindrical piston chamber in which said inner piston is rotatably and axially movably mounted, said outer piston having an outer front wall transverse to said axis facing the calipers and associated with said front face of said inner piston, said front wall having an central oil hole; and wherein said pressure relief means includes said front face having a central tool hole axially aligned with said axis; wherein said pressure relief means further includes a tool having a working end, said tool being adapted to pass through said oil hole and said working end being adapted to be operatively received by said tool hole, said inner piston being adapted to be rotated by said tool so as to rotate about said actuating screw means and so retreat into said housing enclosed portion from said cylindrical piston chamber so that said second actuating area is spaced from said first actuating area; and wherein said leaf spring ring is adapted to be pressed from a first partly biased position to a fully biased position wherein said leaf spring is flattened and occupies a reduced axial distance between said forward and rearward ring members, said reduced axial distance equal to the distance that said second actuating area can be spaced from said first actuating area.

14. A brake system for a motor vehicle connected to a brake fluid pressure system and including calipers positioned around a wheel disc and an emergency brake apparatus, including, in combination, a housing mounted to the vehicle proximate a wheel, said housing including a housing mounting portion holding said calipers and a housing enclosed portion having a housing chamber having an axis, outer piston means positioned in said housing chamber for exerting pressure against said calipers, said outer piston being axially aligned with and movable along said axis, said outer piston means having a first actuating area, inner piston means positioned in said outer piston for moving said outer piston means from an inactivated position to a selected activated position so as to create pressure against said calipers and said disc, said inner piston means having a second actuating area in pressure contact with said first actuating area, said inner piston means being rotatable about said axis and movable along said axis, actuating screw means positioned in said housing chamber for providing rotational and axial movement for said inner piston relative said outer piston means, said actuating screw means also being operatively connected to the emergency brake apparatus, fluid chamber means in said housing chamber operatively connected to the brake fluid pressure system, said fluid chamber means being for containing brake fluid of the brake fluid system so that fluid pressure can be exerted against said inner piston when the brake fluid brake system is activated so a to rotate and axially move said inner piston means relative said actuating screw means, return means for moving said outer piston from said selected activated position to said inactivated position when the brake fluid system is deactivated, pressure means for maintaining said inner piston means in contact with said outer piston means and for initiating movement of said inner piston means from said inactivated position towards said selected activated position upon activation of the brake fluid system, and said inner piston means including a cylindrical inner piston having an axis coextensive with said axis and a front face transverse to said axis; and said outer piston means including a cylindrical outer piston having a axis coextensive with said axis, said outer piston forming a cylindrical piston chamber adapted to slidingly receive said inner piston, said outer piston having an outer front wall transverse to said axis facing the calipers and associated with said front face of said inner piston, said front wall having an central oil hole, and sealing means mounted to said inner piston means for preventing contamination of said first and second actuating areas from contamination passing through said oil hole.

15. The brake system according to claim 14, wherein said inner piston means includes a cylindrical inner piston having an axis coextensive with said axis and a front face transverse to said axis; said inner piston having a forward inner piston portion and a rearward inner piston portion, said rearward inner piston portion being of greater diameter than said forward piston portion; wherein said outer piston means includes a cylindrical outer piston having an axis coextensive with said axis, said outer piston forming a cylindrical piston chamber in which said inner piston is rotatably and axially movably positioned, said piston chamber including a forward piston chamber portion and a rearward piston chamber portion, said forward and rearward inner piston portions being rotatably and axially movably positioned in said forward and rearward piston chamber portions, respectively; said outer piston having an outer front wall transverse to said axis facing the calipers and associated with said front face of said inner piston; said forward cylindrical piston portion having a radius spaced radially inwardly from said second taper.

16. The brake system according to claim 15, wherein said forward cylindrical inner piston portion has a forward cylindrical outer surface forming at least one circumferential groove, and said forward cylindrical chamber portion has a forward cylindrical inner surface and further including a seal positioned in said at least one groove, said seal being in sealing contact with said forward cylindrical inner surface of said outer piston, wherein said first and second actuating areas are protected from contaminates entering said piston chamber through said oil hole.

17. The brake system according to claim 16, wherein said at least one groove is a plurality of circumferential grooves and said seal is a plurality of seals positioned in said grooves.

18. The brake system according to claim 15, further including pressure relief means associated with said inner piston means for axially rotating and moving said inner piston means from contact with said outer piston means at said first and second actuating areas, wherein said outer piston means can be subsequently moved inwardly into the housing without resistance.

19. The brake system according to claim 18, wherein said pressure relief means includes said front face having a central tool hole axially aligned with said axis.

20. The brake system according to claim 19, where said pressure relief means further includes a tool having a working end, said tool being adapted to pass through said oil hole and said working end being adapted to be operatively received by said tool hole, said inner piston being adapted to be rotated by said tool so as to rotate about said actuating screw means and so retreat into said housing enclosed portion from said cylindrical piston chamber so that said second actuating area is spaced from said first actuating area.

21. The brake system according to claim 20, wherein said inner piston includes a rear face reverse from said front face and a rear actuating portion connected to said rear face, said rear actuating portion having a cylindrical actuating recess axially coextensive with said axis and having internal threads; and wherein said actuating screw means includes an elongated cylindrical actuating member positioned in said actuating recess axially coextensive with s id axis and having external threads mated with said external threads, said actuating member having opposed outer and inner ends, said inner end being rotatably secured to said housing and there connected to the emergency brake apparatus, said outer end being positioned in said actuating recess, said inner piston being rotatably movable in a first direction about said actuating member at said cylindrical recess and being simultaneously axially movable outwardly so as to press said second actuating area against said first actuating area so as to move said outer piston outwardly against said calipers upon activation of said brake fluid system, said inner piston being also rotatably movable in a second direction about said actuating member so as to move said second actuating area axially inwardly away from said first actuating area upon rotation of said wrench in said tool hole.

22. The brake system according to claim 15, wherein said inner piston has a forward inner piston portion and a rearward inner piston portion, said rearward inner piston portion being of greater diameter than said forward piston portion; wherein said piston chamber includes a forward piston chamber portion and a rearward piston chamber portion, said forward and rearward inner piston portions being rotatably and axially movably positioned in said forward and rearward piston chamber portions, respectively; wherein said forward piston chamber portion has a forward cylindrical inner surface and said rearward piston chamber portion has a rearward cylindrical inner surface, said forward and rearward cylindrical inner surfaces in part defining said forward and rearward piston chamber portions, respectively; wherein a first circumferential taper is located between said forward and rearward cylindrical inner surfaces, said first taper having a circumferential area which is said first actuating area; said rearward inner piston having a rearward cylindrical outer surface; and wherein a second circumferential taper is located between said forward and rearward cylindrical outer surfaces, said second taper having a second circumferential area which is said second actuating area; and wherein said brake system is a non-drag system, and wherein said pressure means is positioned is said rearward piston chamber portion and includes leaf spring means positioned in pressure bearing association with said inner piston and retaining means secured to said rearward cylindrical inner surface of said outer piston spaced from said leaf spring means, said leaf spring means being biased so as to maintain pressure contact between said first and second actuating areas and to initiate movement of said inner piston at said actuating member upon activation of the brake fluid pressure system, said retaining means being for maintaining said leaf spring means in a biased mode.

23. The, brake system according to claim 22, wherein said leaf spring means includes a leaf spring ring axially coextensive with said axis and spaced from said rearward cylindrical inner surface of said outer piston; a roller bearing ring axially coextensive with said axis and positioned between said leaf spring ring and said rear face of said inner piston in sliding contact with said rearward cylindrical inner surface of said outer piston; a forward ring member axially coextensive with said axis positioned in pressure contact with said roller bearing ring and said leaf spring ring and in sliding contact with said rearward cylindrical inner surface; and a rearward ring member axially aligned with said axis in pressure contact with said bearing member and with said retaining means and in sliding contact with said rearward cylindrical inner surface of said outer piston; and wherein said retaining means is a retaining ring, said rearward cylindrical inner surface of said outer piston having a circular groove, said retaining ring being positioned in said groove.

24. A non-drag brake system for a motor vehicle connected to a brake fluid pressure system and including calipers positioned around a wheel disc and an emergency brake apparatus, including, in combination,
a housing mounted to the vehicle proximate a wheel, said housing including a housing mounting portion holding said calipers and a housing enclosed portion having a housing chamber having an axis,
outer piston means positioned in said housing chamber for exerting pressure against said calipers, said outer piston being axially aligned with and movable along said axis, said outer piston means having a first actuating area,
inner piston means positioned in said outer piston for moving said outer piston means from an inactivated position to a selected activated position so as to create pressure against said calipers and said disc, said inner piton means having a second actuating area in pressure contact with said first actuating area, said inner piston means being rotatable about said axis and movable along said axis,
actuating screw means positioned in said housing chamber for providing rotational and axial movement movement for said inner piston relative said outer piston means, said actuating screw means also being operatively connected to the emergency brake apparatus,
fluid chamber means in said housing chamber operatively connected to the brake fluid pressure system, said fluid chamber means being for containing brake fluid of the brake fluid system so that fluid pressure can be exerted against said inner piston when the brake fluid brake system is activated so as to rotate and axially move said inner piston means relative said actuating screw means,
return means for moving said outer piston from said selected activated position to said inactivated position when the brake fluid system is deactivated, and
pressure means for maintaining said inner piston means in contact with said outer piston means and for initiating movement of said inner piston means from said inactivated position towards said selected activated position upon activation of the brake fluid system, said pressure means being positioned in said housing chamber and including leaf spring means positioned in bearing association with said inner piston means and retaining means secured outer piston means spaced from said leaf spring means, said leaf spring means being biased so as to maintain pressure contact between said inner and outer piston means and to initiate movement of said inner piston means at said actuating screw means upon activation of the brake fluid pressure system, said retaining means being for maintaining said leaf spring means in a biased mode.

25. The non-drag brake system according to claim 24, wherein said inner piston means includes a cylindrical inner piston having an axis coextensive with said axis and a front face transverse to said axis; and said outer piston means includes a cylindrical outer piston having an axis coextensive with said axis, said outer piston forming a cylindrical piston chamber in which said inner piston is rotatably and axially movably mounted, said outer piston having an outer front wall transverse to said axis facing the calipers and associated with said front face of said inner piston, said inner piston having a forward inner piston portion and a rearward inner piston portion, said rearward inner piston portion being of greater diameter than said forward piston portion, said piston chamber including a forward piston chamber portion and a rearward piston chamber portion, said forward and rearward inner piston portions being rotatably and axially movably positioned in s id forward and rearward piston chamber portions, respectively; and wherein said forward piston chamber portion has a forward cylindrical inner surface and said rearward piston chamber portion has a rearward cylindrical inner surface, said forward and rearward cylindrical inner surfaces in part defining said forward and rearward piston chamber portions, respectively; wherein first circumferential taper is located between said forward and rearward cylindrical inner surfaces, said first taper having a first circumferential area which is said first actuating area; wherein said rearward inner piston has a forward cylindrical outer surface and a rearward cylindrical outer surface; and wherein a second circumferential taper is located between said forward and rearward cylindrical outer surfaces, said second taper having a second circumferential area which is said second actuating area; and wherein said leaf spring means includes leaf spring ring axially coextensive with said axis and spaced from said rearward cylindrical inner surface of said outer piston; a roller bearing ring axially coextensive with said axis and positioned between said leaf spring ring and said rear face of said inner piston in sliding contact with said rearward cylindrical inner surface of said outer piston; a forward ring member axially coextensive with said axis positioned in pressure contact with said roller bearing ring and said leaf spring ring and in sliding contact with said rearward cylindrical inner surface; and a rearward ring member axially aligned with said axis in pressure contact with said bearing member and with said retaining means and in sliding contact with said rearward cylindrical inner surface of said outer piston; and wherein said retaining means is a retaining ring, said rearward cylindrical inner surface of said outer piston having a circular groove, said retaining ring being positioned in said groove.

26. The non-drag brake system according to claim 25, further including pressure relief means associated with said inner piston means for axially rotating and moving said inner piston means from contact with said outer piston means at said first and second actuating areas, wherein said outer piston means can be subsequently moved inwardly into the housing without resistance.

27. The non-drag brake system according to claim 26, wherein said front wall of said outer piston has a central oil hole, and wherein said pressure relief means includes said front face having a central tool hole axially aligned with said axis.

28. The brake system according to claim 27, wherein said pressure relief means further includes a tool having a working end, said tool being adapted to pass through said oil hole and said working end being adapted to be operatively received by said tool hole, said inner piston being adapted to be rotated by said tool so as to rotate about said actuating screw means and so retreat into said housing enclosed portion from said cylindrical piston chamber so that said second actuating area is spaced from said first actuating area.

29. The brake system according to claim 28, wherein said inner piston includes a rear face reverse from said front face and a rear actuating portion connected to said rear face, said rear actuating portion having a cylindrical actuating recess axially coextensive with said axis and having internal threads; and wherein said actuating screw means includes an elongated cylindrical actuating member positioned in said actuating recess axially coextensive with said axis and having external threads mated with said external threads, said actuating member having opposed outer and inner ends, said inner end being rotatably secured to said housing and there connected to the emergency brake apparatus, said outer end being positioned in said actuating recess, said inner piston being rotatably movable in a first direction about said actuating member at said cylindrical recess and being simultaneously axially movable outwardly so as to press said second actuating area against said first actuating area so as to move said outer piston outwardly against said calipers upon activation of said brake fluid system, said inner piston being also rotatably movable in a second direction about said actuating member so as to move said second actuating area axially inwardly away from said first actuating area upon rotation of said wrench in said tool hole.

30. The non-drag brake system according to claim 26, wherein said forward cylindrical inner piston portion includes said front face.

31. The non-drag brake system according to claim 25, wherein said forward cylindrical inner piston portion has a radius spaced radially inwardly from said second taper.

32. The non-drag brake system according to claim 31, wherein said forward cylindrical inner piston portion has a cylindrical outer surface forming at least one circumferential groove, and further including a seal positioned in said at least one groove, said seal being in sealing contact with said forward cylindrical surface portion of said outer piston, wherein aid first and second actuating areas are protected from contamination entering said piston chamber through said oil hole.

33. The non-drag brake system according to claim 32, wherein said at least one groove is a plurality of circumferential grooves and said seal is a plurality of seals positioned in said plurality of grooves.

34. The non-drag brake system according to claim 33, wherein said forward cylindrical inner piston has a radius extending to said second taper.

* * * * *